United States Patent
Devara et al.

(10) Patent No.: US 8,909,306 B2
(45) Date of Patent: Dec. 9, 2014

(54) METHOD TO CONSERVE POWER ON A WIRELESS MOBILE DEVICE USING WEB BROWSER STATE KNOWLEDGE

(75) Inventors: Kavitha Vallari Devara, La Jolla, CA (US); Ashfaque Mansur, San Diego, CA (US); Shyama Prasad Mondal, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 269 days.

(21) Appl. No.: 13/567,937

(22) Filed: Aug. 6, 2012

(65) Prior Publication Data

US 2013/0143504 A1   Jun. 6, 2013

Related U.S. Application Data

(60) Provisional application No. 61/567,003, filed on Dec. 5, 2011.

(51) Int. Cl.
- *H04B 1/38* (2006.01)
- *H01Q 11/12* (2006.01)
- *H04B 1/04* (2006.01)
- *H04B 1/16* (2006.01)

(52) U.S. Cl.
USPC .............. 455/574; 455/127.5; 455/343.1

(58) Field of Classification Search
USPC .......... 455/574, 343.1, 343.4, 127.5; 375/222
See application file for complete search history.

(56) References Cited

U.S. PATENT DOCUMENTS

| | | | |
|---|---|---|---|
| 7,949,377 | B2 | 5/2011 | Islam et al. |
| 2007/0233835 | A1* | 10/2007 | Kushalnagar et al. ........ 709/223 |
| 2008/0194266 | A1 | 8/2008 | Islam et al. |
| 2008/0253312 | A1 | 10/2008 | Park |
| 2009/0028084 | A1 | 1/2009 | Ping |
| 2010/0118752 | A1 | 5/2010 | Suzuki et al. |
| 2011/0222450 | A1 | 9/2011 | Youssef et al. |
| 2011/0249575 | A1 | 10/2011 | Dwyer et al. |
| 2012/0120799 | A1 | 5/2012 | Brisebois et al. |
| 2012/0124196 | A1 | 5/2012 | Brisebois et al. |

OTHER PUBLICATIONS

"Fast Dormancy Best Practises," GSM Association, Official Document TS.18, Version 1.0, Jul. 27, 2011, pp. 1-23.

Qian, et al., "Characterizing Radio Resource Allocation for 3G Networks," IMC'10, Nov. 1-3, 2010, Melbourne, Australia, pp. 137-150.

* cited by examiner

*Primary Examiner* — Nguyen Vo
(74) *Attorney, Agent, or Firm* — Neugeboren O'Dowd PC

(57) ABSTRACT

Systems, methods, and apparatus are disclosed for conserving battery power in a user equipment (UE) by idling the modem when it is not needed in an active state. Idling can occur (1) between a user request for content and the start of the content download; (2) after the content download; and (3) after additional dynamic content has been downloaded, further scripting has finished, or UE data has been uploaded to the network, but before another user request for content has been made. Grace timers can be used before the second and third idle opportunities to ensure that the modem is not idled while still in use, but also to minimize the time that the modem is in an active state but not being used. These timers can be fixed or dynamic and their duration based on historical trends or testing of particular content or content types.

30 Claims, 9 Drawing Sheets

METHOD TO CONSERVE POWER ON A WIRELESS MOBILE DEVICE USING WEB BROWSER STATE KNOWLEDGE

CLAIM OF PRIORITY UNDER 35 U.S.C. §119

The present Application for Patent claims priority to Provisional Application No. 61/567,003 entitled "METHOD TO CONSERVE POWER ON A WIRELESS MOBILE DEVICE USING WEB BROWSER STATE KNOWLEDGE" filed Dec. 5, 2011, and assigned to the assignee hereof and hereby expressly incorporated by reference herein.

BACKGROUND

1. Field

The present disclosed embodiments relate generally to wireless mobile computing devices, and more specifically to power savings in the same relative to idling the modem.

2. Background

Mobile communication devices including devices such as smartphones, tablet computers, gaming devices, and laptop computers are now ubiquitous. A common and ongoing issue with these types of devices is power management. More specifically, these types of devices continue to develop more advanced processing resources, displays, and communication systems that demand more and more power.

Although advances continue to be made in the areas of battery technology and hardware efficiency, these advances do not directly address the users' experience when a mobile device is operating under power constraints. As a consequence, the current mobile device power management techniques are not adequate to meet user expectations and will almost certainly not be satisfactory in the future.

One aspect of power management involves idling of the modem when not needed. The Radio Resource Control (RRC) protocol is responsible for assigning radio resources between the user equipment (UE) and the network (see the 3rd Generation Partnership Project (3GPP), "Radio Resource Control (RRC) Protocol Specification", Tech. Spec. 25.331, 2006). The RRC states in WCDMA packet data are illustrated in FIG. 2, and are described below (similar states apply to GSM and EvDO/DO networks).

FIG. 2 illustrates various radio or modem modes of a typical user equipment (UE). Generally, a UE has an active state 202 and an idle state 204. Within the active state 202 there can be three sub-modes: CELL_DCH 206, CELL_FACH 208, and CELL_PCH 210. In some cases, a fourth sub-mode can also exist (not illustrated).

Idle state 204 consumes less power than the active state 202 or any of the sub-modes of the active state 202. This is because the UE does not have an RRC connection and thus the UE does not transmit in this mode, or transmits only rarely (e.g., Location Area Updates and Routing Area Updates, which are infrequent). The UE can still have an IP address (i.e., a PDP context) and it can be reached by paging, but the connection must be reestablished before data can be transmitted from the UE. Because the UE is required to monitor the paging channel only at intervals, the modem does not need to be continuously on, but will instead enter the active state periodically. The trade-off for this is greater latency to send/receive data. However, if this latency is not too great, the advantages of being in the idle state and saving battery power outweigh the disadvantages of the greater connection latency.

The network typically controls the RRC state, and since the network may not know when the UE has completed a given data exchange, it typically keeps the RRC connection active for some fixed time delay in anticipation of more data to/from the UE. The problem with this is that the modem stays in an active state often after data transmission has ceased, thus wasting power.

There is therefore a need in the art for systems and methods to determine a dynamic time delay after which the RRC connection is to be transitioned to an idle state.

SUMMARY

Embodiments disclosed herein address the above stated needs by providing, in one aspect, a method of operating a modem of a user equipment. The method can include operating the modem of the user equipment in an active state when download of content is requested. The method can further include downloading static content to a memory of the user equipment. The method further can include determining if dynamic data transfer is to follow the downloading of the static content. If there is to be dynamic data transfer, then the method can include starting a grace timer upon completion of the downloading of the static content, performing the dynamic data transfer, and ending the grace timer after a time predicted to coincide with completion of the performing dynamic data transfer. The method can further include operating the user equipment modem in a first idle state when the grace timer has ended.

In another aspect, embodiments disclose a user equipment having a modem, a modem state controller, and a grace timer module. The modem can be configured to have a connection to a network and to perform static and dynamic data transfer to and from the network via the connection when in an active state, the modem downloading static content in response to a request for the content. The modem state controller can be configured to, after a grace timer has run, cause release of the connection to the modem thus allowing the modem to enter an idle state. The grace timer can be configured to determine if the modem is to perform dynamic data transfer following the downloading of the static content. If not, then the grace timer is to instruct the modem state controller to cause release of the connection to the modem after the downloading of the static content. If the modem is to perform dynamic data transfer, then the grace timer is configured to perform the following: estimate a predicted length of time for the dynamic data transfer; determine if the predicted length of time for the dynamic data transfer is longer than a fixed time delay; instruct the modem state controller to cause release of the connection to the modem. The instruction to release the connection to the modem occurs after: (1) the fixed time delay, if the predicted length of time for the dynamic data transfer is less than or equal to the fixed time delay; and (2) a dynamic time delay if the predicted length for the dynamic data transfer is greater than the fixed time delay. It should be noted that the dynamic time delay can be substantially equal to the predicted length of time for the dynamic data transfer.

Another aspect of the disclosure is an apparatus having means for the following: operating a user equipment modem in an active state; downloading content to the user equipment; running a grace timer configured to run from the end of the downloading the content until an end of any dynamic data transfer following the downloading of the content, where the grace timer is fixed if a predicted grace requirement is less than a threshold time, and where the grace timer is dynamic if the predicted grace requirement is greater than or equal to the threshold time; operating the user equipment modem in an idle state after running the grace timer; and returning the user equipment modem to the active state when a request for the active state of the modem arises.

Yet another aspect of the disclosure is a non-transitory, tangible computer readable storage medium, encoded with processor readable instructions for user equipment power savings via a method of controlling an active and an idle state of a modem of a user equipment. The method can include operating a user equipment modem in an active state; downloading content to the user equipment; running a grace timer configured to run from the end of the downloading the content until an end of any dynamic data transfer following the downloading of the content, where the grace timer is fixed if a predicted grace requirement is less than a threshold time, and where the grace timer is dynamic if the predicted grace requirement is greater than or equal to the threshold time; operating the user equipment modem in an idle state after running the grace timer; and returning the user equipment modem to the active state when a request for the active state of the modem arises.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Static content, or a static portion of content, (e.g., a news article) is used herein to refer to content that is rendered in the same manner across various UE and appears the same to various users. Static content is typically stored on one or more remote servers and then sent to a client web browser. It can be updated by the content owner on the remote servers, but users cannot affect what content they view. Static content is often, but not always, coded in Hypertext Markup Language, HTML.

Dynamic content (e.g., a banner advertisement) is also stored on a server and sent to the client web browser, but in contrast, can appear different to different users depending on their interaction with a webpage. User profiles and user tendencies stored in that profile (e.g., cookies) can also trigger the different dynamic content for different users. For instance, different users may view different advertisements on a website, or two viewers may "mouse-over" different animated text on a webpage, thus providing different users with different experiences of content. The end of dynamic content download is not easily identified, as it can depend on user interaction with the UE as well as user preferences and tendencies as stored in a user profile.

Figure 2:
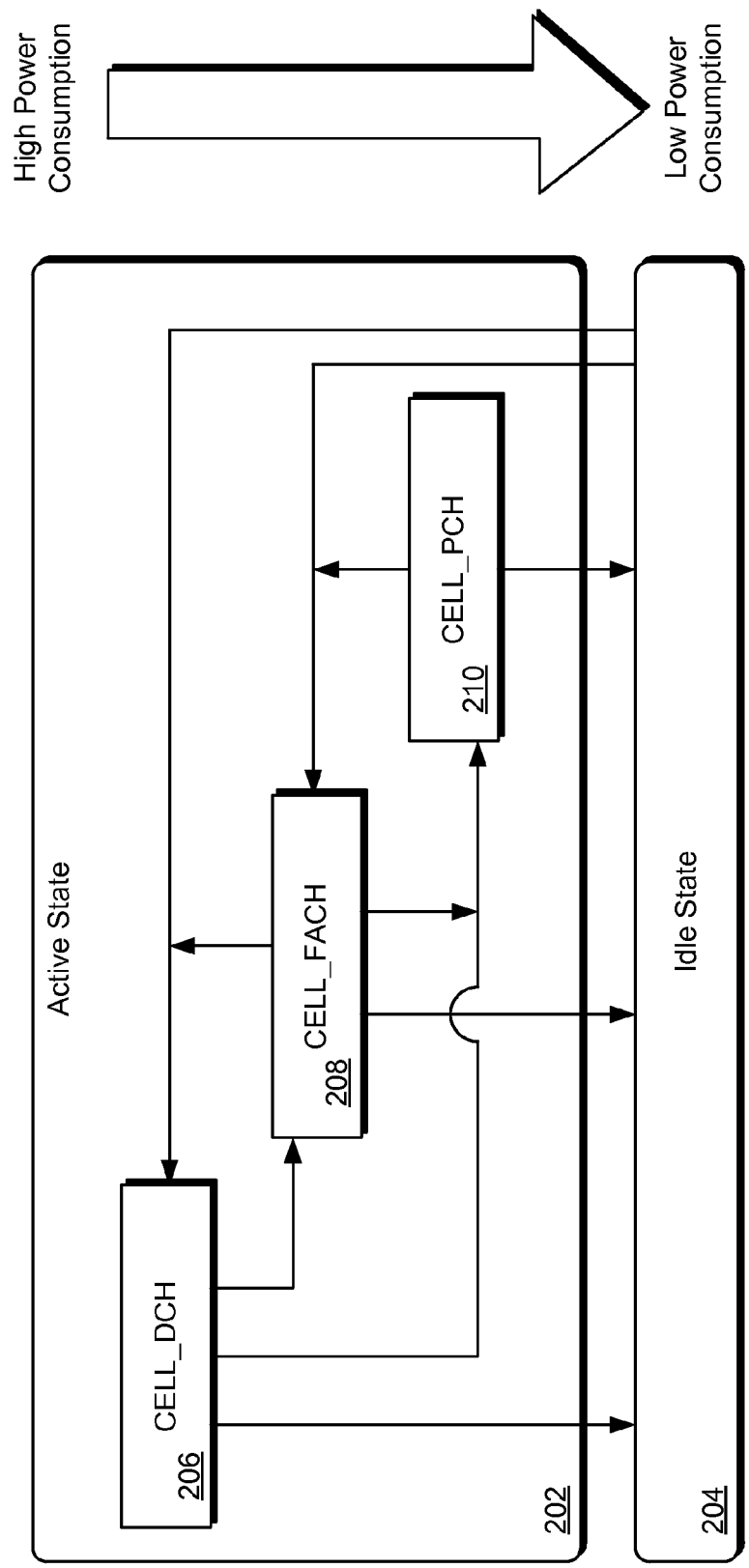
FIG. 2 illustrates various radio or modem modes of a typical user equipment.

Referring to FIG. 2, while there are technically 3-4 active RRC states 206, 208, 210 and an idle state 204, for the purposes of this disclosure, only two RRC states are discussed: active 202 and idle 204. The active state 202 corresponds to any of the 3-4 active RRC states 206, 208, 210 described in the 3GPP specification. Therefore, all references to the active state 202 are inclusive of one or more of the CELL_DCH 206, CELL_FACH 208, and CELL_PCH 210 modes.

The user equipment (UE) or the network can control the modem state (RRC state or mode). For instance, when the UE uploads data to the network (e.g., cookies), the UE can request the active RRC state, and when the network downloads data to the UE, the network can request the active RRC state. Moving to a modem idle state or an RRC idle state, can also be known as an RRC release or a TCH release (traffic channel release).

Systems, methods, and apparatus are herein disclosed for conserving battery power in a user equipment (UE) by idling the modem when it is not needed in an active state. One aspect of idling the modem is the use of grace or delay timers to ensure that the modem is not idled prior to the completion of upload or download activities. Such timers are known in the art, but tend to be fixed timers, thus leaving the modem in an active state for longer than necessary. For instance, while many users spend around 10 seconds looking at a webpage once it has finished loading, and thus the active state of the modem is not needed during this 10 seconds, most mobile modems remain in the active state for a fixed 8 second period after the last data packet has been received. There is therefore 8 seconds of unnecessary power consumption in the active state.

In this disclosure, idling can occur during the following three time periods: (1) between a request for content and the start of the content download; (2) after the content download and any dynamic data transfer; and (3) after additional dynamic data transfer, but before another request for content has been made. Grace timers can be used before the second and third opportunities to ensure that the modem is not idled while still in use, but also to minimize the time that the modem is in an active state but not being used. Values of grace timers (as compared to the fixed timers of the art) can be fixed or dynamic and their duration can be based on historical trends or testing of particular content or content types.

Figure 1:
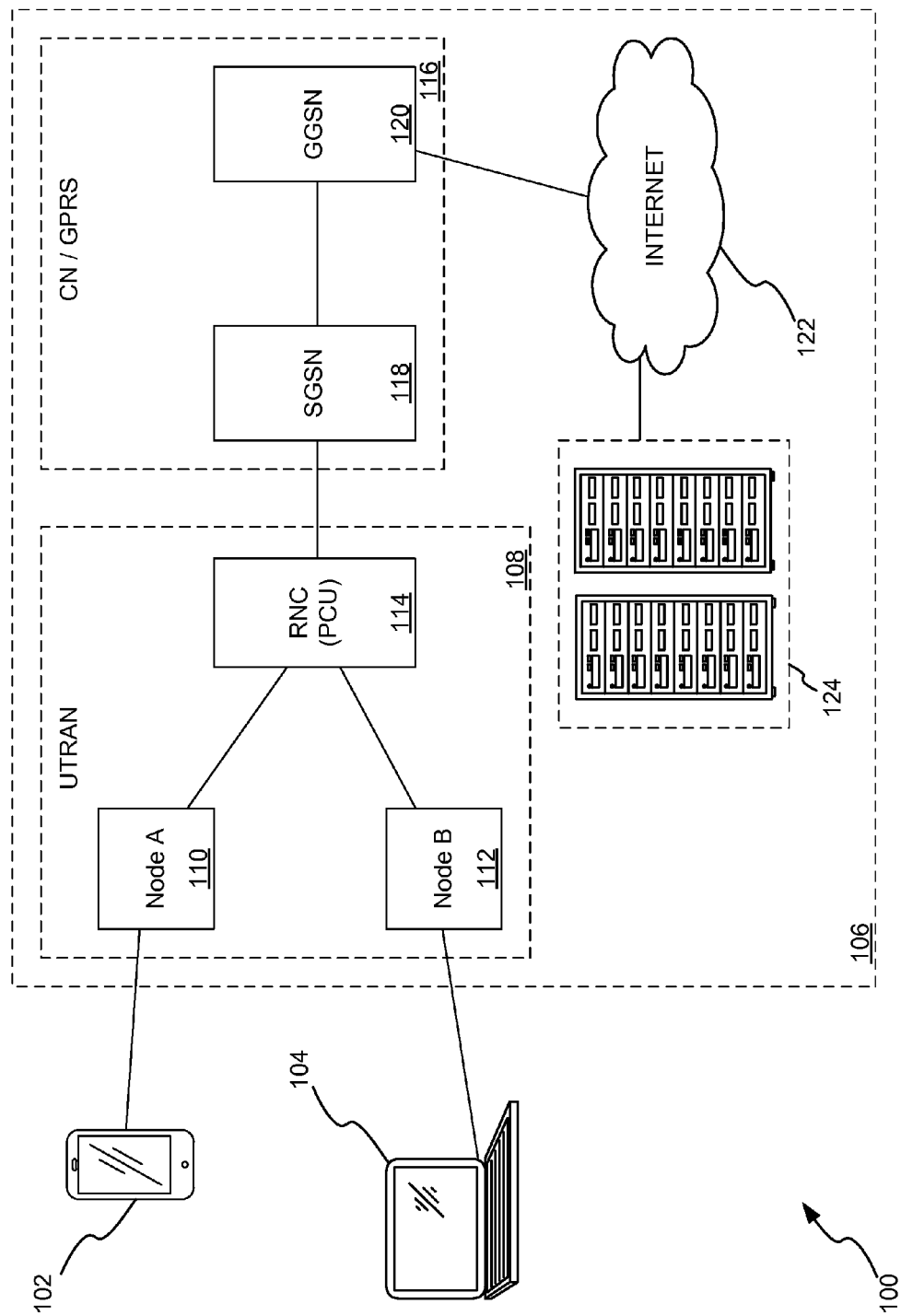
FIG. 1 illustrates an exemplary UMTS architecture.

FIG. 1 illustrates an exemplary UMTS architecture. The universal mobile telecommunications system (UMTS) 100 includes user equipment (UE) 102 and 104 (e.g., cell phone, smartphone, tablet computer, laptop computer, netbook, ultrabook, etc.) in communication with a network 106. The network 106 includes a UMTS terrestrial radio access network (UTRAN) 108, which includes two or more wireless nodes (e.g., base stations or cells) such as node A 110 and node B 112 and a radio node controller (RNC) 114. For GSM, the RNC 114 can be replaced with a packet control unit (PCU). The network 106 also includes a core network (CN) 116 or general packet radio service (GPRS) core network, which includes a serving GPRS support node (SGSN) 118, and a gateway GPRS support node (GGSN) 120. The CN 116 connects to the Internet 122 via the GGSN 120. Remote web servers 124 are in communication with the Internet 122 such that communications between the UE 102, 104 and the remote web servers 124 is made via the UTRAN 108, CN 116, and Internet 122.

The UE 102, 104 include an active state and an idle state. The network 106 or the UE 102, 104 can control whether the UE 102, 104 modem is idle or active. In particular, whatever is transmitting data can control the modem active-idle state. For example, where the network 106 is transmitting to the UE 102, 104, the network 106 controls the active-idle state of the UE 102, 104 modems, and where the UE 102, 104 are transmitting, the UE 102, 104 control the modem state. While the UE 102 is illustrated as a smartphone and the UE 104 is illustrated as a laptop or netbook, various other mobile wireless devices also fall within the definition of a UE (e.g., cell phone, tablet, etc.).

Operation of the UMTS 100 will now be discussed with reference to the architecture of FIG. 1 as well as the method illustrated in FIG. 3. When either UE 102, 104 requests, receives, and renders content from the remote web servers 124, there are two or more time periods in which the power-hungry wireless connection can be put into a lower-power state. First, after a content request (Block 302) is made, there is often a lag before the requested data begins to download to the UE 102, 104 (Block 306). If this lag or latency is long enough, then the wireless connection can be placed into a lower-power or idle state (Block 304). If not, then the wireless connection can remain as is during the lag or delay. Either way, the content (e.g., static content of a webpage) will begin to download (Block 306) over the wireless connection to the UE 102, 104 after some time.

When the download is complete (e.g., all static content of a webpage has downloaded), there is a second opportunity to put the wireless connection into a lower-power state. In cases where dynamic data transfer is to occur after the static content download, a first grace timer may run (Block 308) so that the modem is not idled during this dynamic modem usage. Dynamic data transfer can include, but is not limited to, download of dynamic content, additional scripting seeking to download further content, or an upload. After the first grace timer ends, or immediately after the static content download if no grace timer is needed, the UE 102, 104 modem can be idled during this second idling opportunity (Block 310). If the modem enters the idle state, then the connection can be reactivated when another request for content is made. This request for content can either be a request for further static content (Block 302) (e.g., a request for direction of a web browser to a new URL) or a further request for dynamic data transfer (Block 312). If a further request for dynamic data transfer (Block 312), then the request can include a request for the following: dynamic content download (e.g., a new advertisement or animated text activated by the user); further scripting; or a data upload from the UE 102, 104 to the network 106 (Block 312).

If, after the second idle (Block 310), there is a request for dynamic data transfer (Block 312), a second grace timer can be activated (Block 314) so that the modem is not idled during the dynamic data transfer. After the second grace timer has expired, a third opportunity to idle the modem arises (Block 316). The modem can be reactivated when a further request for dynamic data transfer occurs (Block 312), or when another request for static content takes place (Block 302).

Typically the exact end to dynamic data transfer (Blocks 308 and 314) is not known, and thus the grace timer is used to prevent idling of the modem during either of these dynamic data transfers (Blocks 308 and 314). However, there are instances where an exact end to the dynamic data transfer (Blocks 308 and 314) can be known. For instance, a last resource indicator may indicate when the UE has received the last resource of a dynamic data transfer, or when further scripting has ceased, or when a final resource has been uploaded to the network. Where there is a last resource indicator, the grace timers may not be needed.

For instance, NYTIMES.COM may be known to always ping the NYTIMES URL when the last resource has downloaded, so instead of a grace timer, this ping event can be used as a last resource indicator of when the second and third idles (Blocks 310, 316) can start. As another specific example, it may be known that a website logo is the last resource to load once all dynamic content has loaded for a given website. Monitoring for this logo rendering rather than using a grace timer can be used to identify an end to dynamic data transfer. These are just two of many examples of how monitoring for a last resource operation can replace or be used in parallel with grace timers.

It should be understood that only one or more of the three idle opportunities need be taken, and in some instances the modem may not enter the idle state before another request (Block 302) is made. Which idle periods are used depends on a balancing of quality of service (QoS) and power conservation—idle periods can increase latency and thus lower QoS, but they also decrease power consumption.

It should also be understood that "idle" or "idling the modem" or an "idle state" are synonymous with dormancy or a dormant state of the modem.

Scripting can include any script that runs during a browser pageload that triggers an action to fetch further resources over a network. In a particular example, scripting includes JavaScript that loads additional resources based on dynamic behavior (e.g., the end of a grace timer, user preferences, a user action (e.g., a mouse click)).

The content request (Block 302) can include a DNS request, which can be transmitted to the network and the network can reply with an IP address allowing the UE to access content from the IP address. Alternatively, the IP address may be cached or otherwise stored on the UE and correlated with a DNS request, such that when the DNS request is made by the UE, the communication between the UE and the network is merely to download content from the IP address rather than to make a DNS request.

Figure 3:
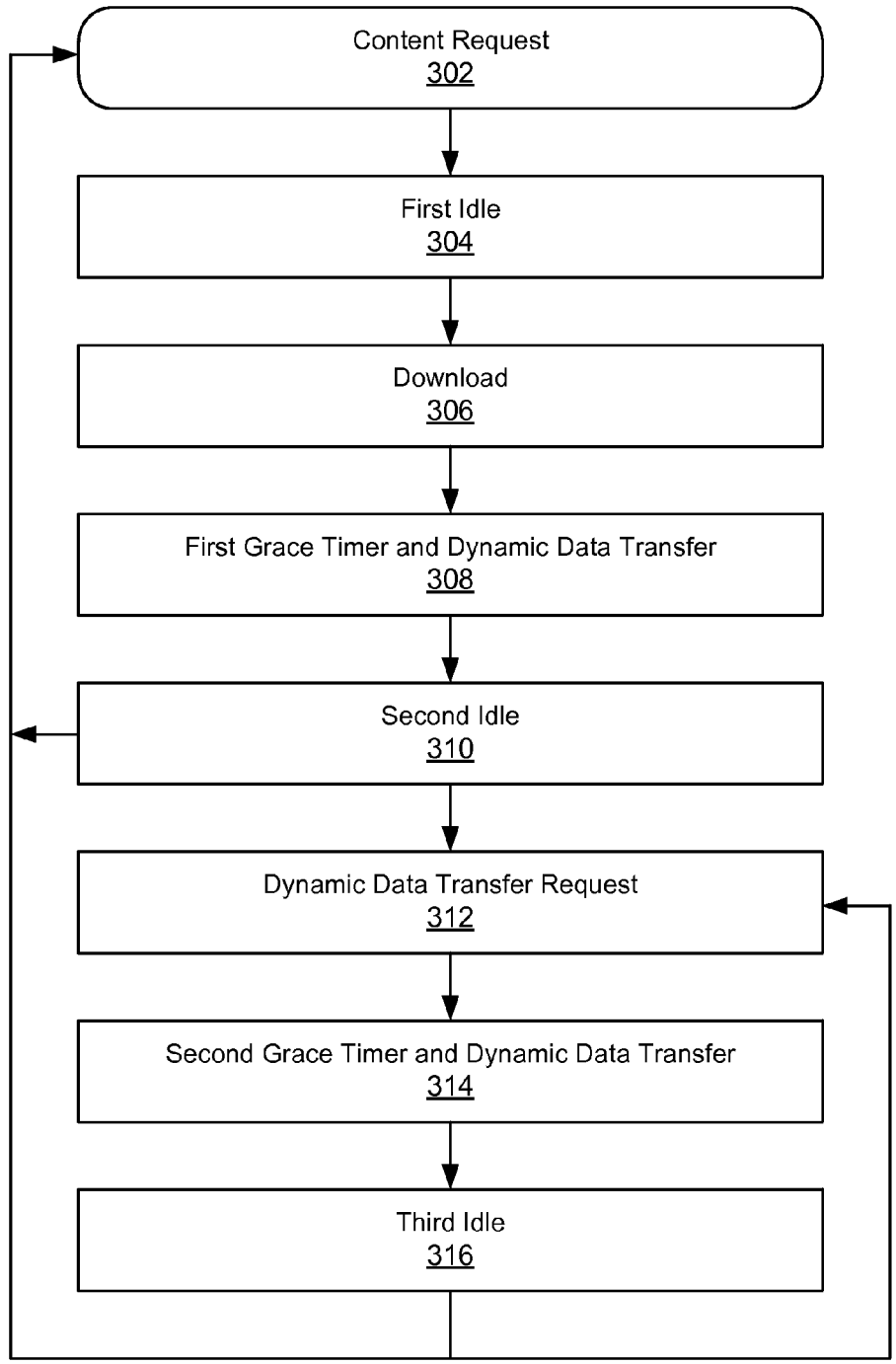
FIG. 3 illustrates a method for reducing power consumption of a user equipment.
Figure 4:
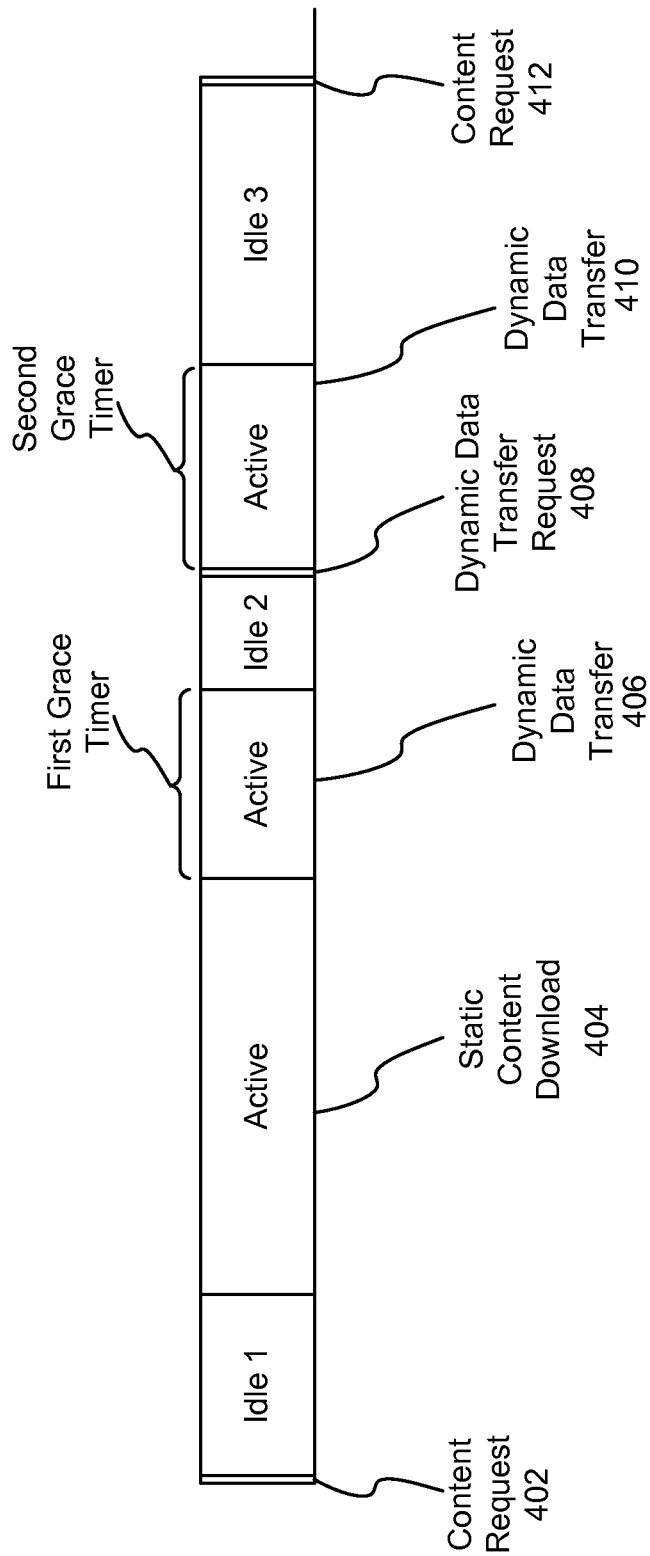
FIG. 4 illustrates a timeline corresponding to the power saving methods disclosed herein.

The method of FIG. 3 can be applied to the particular instance of URL or webpage requests (or any web app) as illustrated in the timeline of FIG. 4. There are three time periods in which the modem of the UE can be idled: idle 1, idle 2, and idle 3. After a content request 402 is made (e.g., domain name server (DNS) request), the modem can be placed into an idle state during the time period idle 1, which spans between the content request 402 and the start of the static content download 404 resulting from the request 402. Whether the modem is idled during idle 1 can depend on the latency (or length) of the time between the content request 402 and the start of the static content download 404. For instance, since it requires additional power to reactivate the modem, the decision to enter the idle state during idle 1 may require that the power saved by idling the modem is greater than the extra power expended by reactivating the modem when the download begins.

The latency can be predicted based on a history of latency for similar DNS requests (e.g., test requests made to determine an average latency for certain URLs). The latency can be compared to a threshold in order to determine whether the modem is to be idled or not. For instance, for latency greater than twice a network setup time, the modem can be idled. As a more specific example, given a network setup time of 1.6 seconds, the threshold can be 3.2 seconds. The network setup time is the time taken to establish the radio (wireless) connection between the UE and the network. For UMTS, the network setup time is the RRC setup time.

Whether the modem is idled during idle 1 or not, the modem is active during the static content download 404 (also referred to herein as a first active period of the modem). In other words, the modem is either returned to an active state before the static content download 404 begins, or the modem is never idled between the content request 402 and the start of the static content download 404.

At the end of the static content download 404 there is a second opportunity to idle the modem during idle 2. As illustrated, the second idle 2 occurs after a dynamic data transfer 406, however, in other cases where there is no dynamic data transfer 408, the idle 2 can begin as soon as the static content download 404 is complete. Put another way, the second idling of the modem can begin as soon as static content has been downloaded to the UE (e.g., there is no delay between the end of the static content download 404 and the start of idling the modem). In some instances, there may be a page load complete marker indicating that the page load is complete. This marker can be used to trigger the start of idle 2.

However, some static downloads 404 may be followed by dynamic data transfer 406. In these cases, a first grace timer can be used to delay the modem idling until the dynamic data transfer 406 is complete. The precise delay required is not known, and thus either a fixed grace timer (e.g., 1 to 2 seconds) can be used that is long enough to account for all or most dynamic data transfer 406, or a dynamic grace timer can be used that is tailored to each dynamic data transfer 406 based on a prediction of the required delay. Fixed grace timers can often be used since most dynamic data transfers 406 are completed within one to two seconds, and thus it is assumed that a two second fixed grace timer is sufficient for many contexts. However, the fixed grace timer sometimes leaves the modem in the active state for unnecessary periods of time, even if only a second or less in duration.

A dynamic grace timer overcomes this problem by tailoring the delay to the particular dynamic data transfer 406 as determined by analysis of known or historical trends or analysis of delays seen relative to particular URLs (e.g., NEWYORKTIMES.COM versus NEWEGG.COM) or particular types of content (e.g., HTML versus JAVASCRIPT). In the case of particular URLs, historical testing and data can show whether a particular URL tends to use dynamic data transfers or not and if so, what the average dynamic data transfer duration is. Some URLs may include more analytics and upload requirements from the UE and thus require longer delays. For instance, when a user performs a GOOGLE search, analytics often entail UE data upload to the network, thus requiring a delay to accommodate the upload time. Historical analysis or testing of particular content types can also be used to tailor grace timers for different content types.

Based on any one or more of these methods, a predicted time for the dynamic data transfer 406 can be determined and compared to a first fixed grace timer threshold (e.g., 1 or 2 seconds). If the predicted time is less than the threshold, then the first grace timer can be a fixed grace timer, and if the predicted time is greater than or equal to the threshold, then the first grace timer can be a dynamic grace timer.

After the first grace timer expires, the modem can be idled during idle 2. The idle 2 period lasts until there is another content request 412 or until there is a request for further dynamic data transfer 408. Either of these events can end the idle 2 period.

In the case of a request for further dynamic data transfer 408, the modem can be placed back into the active state until the dynamic data transfer has been downloaded or the upload has completed. In either case, a second grace timer can be used to keep the modem active until the dynamic data transfer is complete at which point the modem can be idled for idle 3. The second grace timer between the further dynamic data transfer request 408 and the start of idle 3 can again be fixed or dynamic—if the first grace timer was static, then the second grace timer can be static; if the first grace timer was dynamic, then the second grace timer can be dynamic. In some embodiments, the first grace timer can be equal in duration to the second grace timer, such that no new analysis or calculations are performed to determine a length of the second grace timer.

Idle 3 comes to an end when there is another content request 412 or another dynamic data transfer request (not illustrated). In other words, the modem remains idle during idle 3 until some other request for data transfer, and thus activation of the modem, is made.

As seen, there are three opportunities for the modem to be put into an idle state (or more if there are multiple dynamic data transfer requests 408). The modem can be placed into idle during any one or more or none of these opportunities. For instance, the modem may be idled during idle 1 (a second idle state), idle 2 (a first idle state), and/or idle 3 (a third idle state) or during none of the idle periods. In another instance, the modem may be idled during idle 1, but not during idle 2 or 3 (e.g., where another application requests use of the modem during the static content download 404). In yet another instance, the modem may be idled during idles 2 and 3, but not during idle 1 (e.g., where the latency between the content request 402 and the static content download 404 is not low enough to justify idling the modem).

Before any instance of the modem being put into idle, checks can be made to ensure that the modem is not needed for other data transmission/reception duties. In one embodiment, before idling, a check is made for other applications using, requesting, or that will request an active state. Put another way, the idling process is not independent of other applications. In another embodiment, a check can be performed to ensure that another content request 412 has not already been made. These checks ensure that the modem is not idled when it is needed. For instance, a check can be made to see if another content request 412 was made during the first grace timer or during the second grace timer (if applicable). Exemplary checks can be made at the end of the first grace timer and/or the second grace timer.

Dynamic content can include any content downloaded after an initial download of static content 404 (e.g., animations, animated text, pop-up windows, and new advertisements being displayed). Uploads can include analytics requests such as time spent on a given website, cursor positions, and links that have been clicked or selected. Uploads can also include cookies and information that cookies upload to the network.

Quality of service (QoS) or the speed of wireless activities of the UE can be tailored by a user. For instance, while putting the modem in idle may save power, in some cases it can decrease QoS by adding latency to content downloads. Because of this, in an embodiment, the user or the UE can select whether or not to run the modem idling procedures herein disclosed, or can even customize when and how modem idling operates (e.g., power saving mode 904 in FIG. 9). For instance, when a UE battery charge falls below a threshold (e.g., critical low battery threshold), the UE may ask the user whether the user wishes to enter a power saving mode that will enable modem idling as herein disclosed, but will also likely increase latency of wireless activities.

In other embodiments, the user may select these power saving procedures in a settings option for the UE such that the herein disclosed power saving procedures always operate, or always operate when the battery falls below a threshold. Alternatively, the UE may initiate these power saving procedures without the user's permission. In another embodiment, the UE may ask the user's permission to enter this power saving mode when the battery is above a threshold charge, but may automatically enter the power saving mode when the battery is below the threshold charge. In some instances, different portions of the disclosed power saving procedures can be utilized at different battery charge thresholds. For instance, for battery charge above 50%, modem idling may only be enabled during idle 2 and idle 3. However when the battery charge is below 50%, modem idling may be enabled during all of idles 1-3. Where the UE is plugged into a power source (e.g., AC outlet or USB-connected to a laptop), the power saving mode may not operate.

Figure 5:
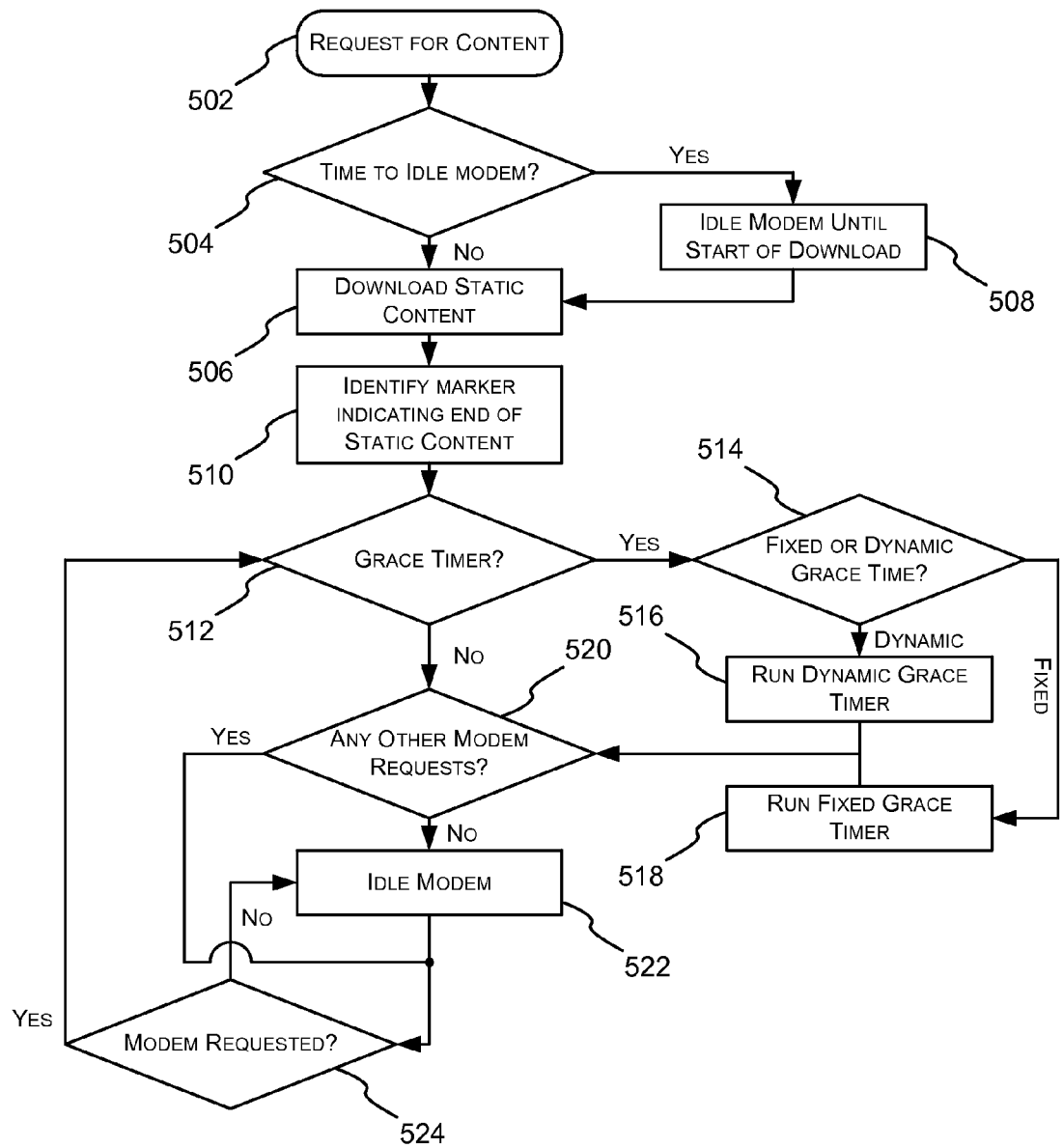
FIG. 5 illustrates another method for reducing power consumption of a user equipment.

FIG. 5 illustrates another method for reducing power consumption of a user equipment (UE). This method will be described in combination with references to the timeline of FIG. 4. UE wireless activity typically begins with a request for content 502 (402). After the request 502 (402) there may be a delay before the download of static content 506 (404) begins. If this delay is long enough, as determined by a time to idle modem decision 504, then the modem can be put into the idle state 508 until the start of the download 506 (for a second idle time Idle 1). The static content (e.g., a page load) is then downloaded 506 with the modem in the active state (404). A marker indicating an end of the static content download can be identified 510 (e.g., a page load complete marker).

The marker can be used to determine when the modem can be idled for a second time (Idle 2) or when a first grace timer can begin to run to account for dynamic data transfer. A grace timer decision 512 determines whether a first grace timer is needed by monitoring whether dynamic data transfer is to immediately follow the static content download 506. If dynamic data transfer is to occur, then the first grace timer activates (first grace timer of FIG. 4) so that the modem is not idled before or during the dynamic data transfer.

The first grace timer can be fixed or dynamic as determined by decision 514. A fixed grace timer can be used where a predicted time for the dynamic data transfer to complete is less than a fixed grace timer threshold (e.g., 1 or 2 seconds). Where the predicted time of the dynamic data transfer is longer the fixed grace timer threshold, a dynamic grace timer can be used. Depending on the length of the predicted time of the dynamic data transfer a fixed grace timer 518 or a dynamic grace timer 516 runs. While the first grace timer runs, the dynamic data transfer can occur (406).

After the first grace timer has run, or in the case where no first grace timer is required as determined by the grace timer decision 512, first modem request decision 520 checks to see if any other UE applications are using or requesting use of the modem or if there are any pending content requests 502 (e.g., a content request 502 made while the first grace timer was running). If none of these uses of the active state exists, then the modem can be idled 522 (for a first idle time Idle 2). If there are, then the modem is kept in an active state.

Requests for further content (either a new request (402 or 502) or a request for dynamic data transfer (408)) can be monitored in a second modem request decision 524. The modem remains idled until the second modem request decision 524 receives a request to activate the modem. Such a request may come from the network, where the network is attempting to download to the UE, and such a request may come from the UE, where the UE is attempting to upload to the network.

When the second modem request decision 524 receives a request, the method returns to the grace timer decision 512 and loops through the various decisions and operations already discussed, including running a fixed grace timer 518 or a dynamic grace timer 516, which in this case corresponds to the second grace timer of FIG. 4. The second grace timer typically mimics the first grace timer, so if the first grace timer was fixed, then the second grace timer is fixed, and if the first grace timer was dynamic, then the second grace timer is dynamic. At the same time that the second grace timer begins to run, the dynamic data transfer occurs (410). The fixed or dynamic grace timer should run 518, 516 just long enough to allow the dynamic data transfer (410) to complete. The length of the second fixed or dynamic grace timer can be the same as the first grace timer.

After the second grace timer has completed, a check for any other modem requests 520 can again be made as a precursor to another idling of the modem (Idle 3). This process then repeats in a similar fashion of idling followed by grace timers followed by idling until another request for content 502 (412) is made. Furthermore, at any point during the above-described method, if another request for content 502 is made (or received) by the UE, then the method can restart at the request for content 502.

The idle times can be a fixed or dynamic value, but either way they can be based upon knowledge of a history of delays under similar download request circumstances. For instance, test downloads can be carried out for different URLs to determine an average delay (or latency) for each URL tested. Similarly, and only for other than the second idle time, tests can be performed on different types of content to determine an average delay (or latency) for different content types. The idle time can also be based on knowledge of the browser state where the request 502 is for a webpage or other web-based content. For instance, a browser that is evaluating JAVASCRIPT is in a different state than a browser that is parsing HTML, and different grace timers may be assigned based on which browser state the browser is in.

One of skill in the art will recognize that the method steps herein described can be interchanged and their order modified and overlapped without departing from the scope of the disclosure. Furthermore, the request 502 can be made by either a user or as an automated request (e.g., a computer-instigated request for content).

Figure 6:
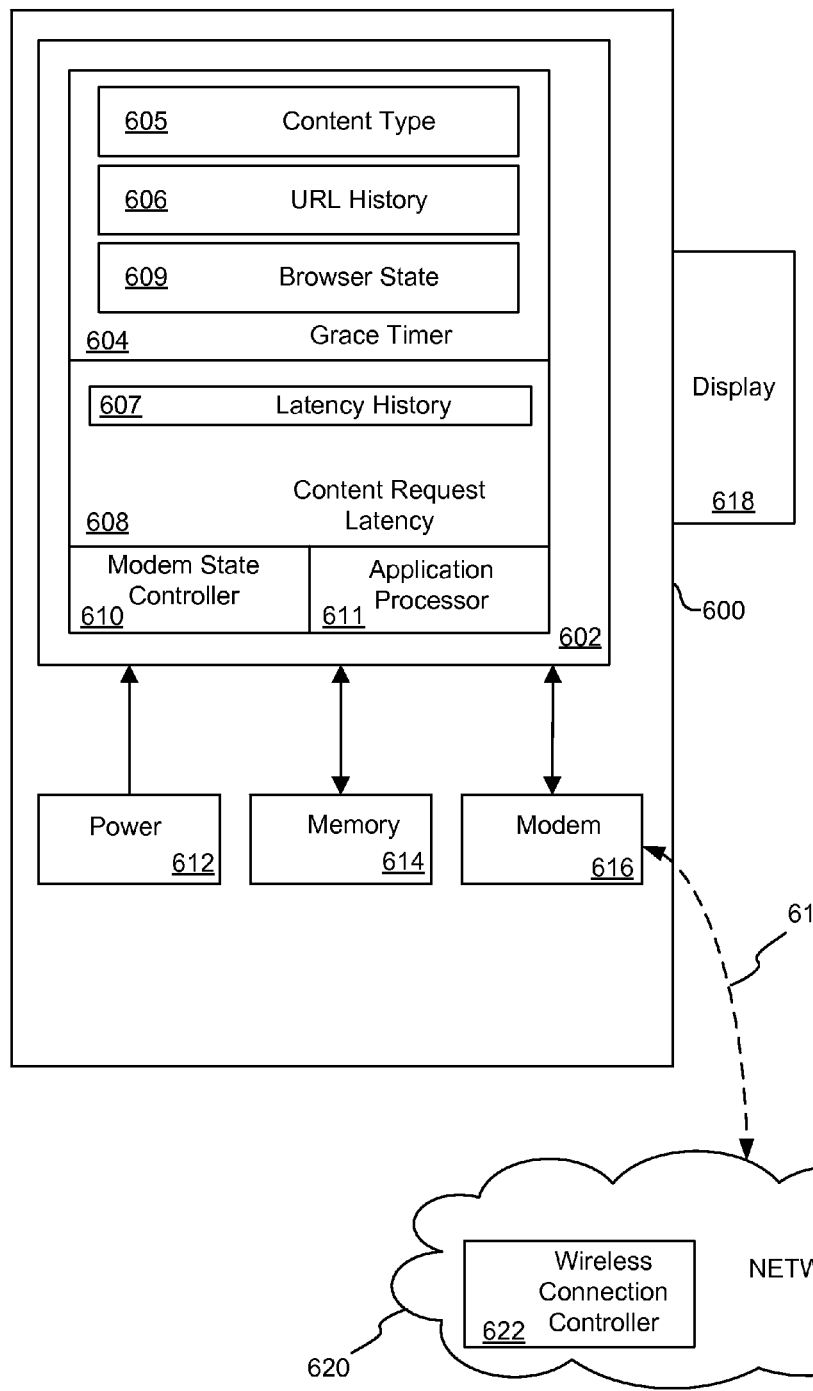
FIG. 6 is a block diagram depicting functional components of an exemplary user equipment according to an embodiment of the disclosure.

Referring next to FIG. 6, shown is a block diagram depicting functional components of an exemplary user equipment (UE) 600 according to an embodiment of the disclosure. The UE 600 is configured to communicate with a network 620 (e.g., a cellular network and/or the Internet) via a wireless connection 619. The network 620 includes a wireless connection controller 622 for controlling the wireless connection 619. As shown, the UE 600 includes an application 602 (e.g., a web browser) that includes a grace timer module 604 inclusive of a content-type sub-module 605, a URL history sub-module 606, and a browser state sub-module 609, a content request latency module 608 inclusive of a latency history sub-module 607, and a modem state controller 610. In addition, the application 602 is in communication with a power module 612, memory 614, the modem 616, and the UE 600 also includes a display 618. The application 602 operates on an application processor 611.

The illustrated arrangement of these components is logical, the connections between the various components are exemplary only, and the depiction of this embodiment is not meant to be an actual hardware diagram; thus one of ordinary skill in the art will readily appreciate that the components can be combined or further separated and sub-divided in an actual implementation, and the components can be connected in a variety of ways without changing the basic operation of the system. Moreover, components may be removed and/or supplemented so that more or less components can be utilized in any particular implementation.

For example, one or more of the grace timer module 604, content request latency module 608, and modem state controller 610 may be realized as separate components from the application 602. And as discussed further herein, only one or two of the grace timer module 604, content request latency module 608, and modem state controller 610 are implemented in some embodiments. Moreover, the depicted components may be integrated to such an extent that it is difficult to identify separable components or modules.

The UE 600 may be realized by a variety of devices including, but not limited to, smartphones, tablet computers, netbooks, laptops, gaming devices, and digital cameras that rely on a limited energy source that resides on the UE 600. The application 602 in this embodiment generally operates, in connection with the display 618, to present content to a user. As discussed further herein, the application 602 may obtain (download) content from remote sources (e.g., web servers) and utilize the memory 614 to cache portions of the received content for later use. For example, the application 602 may be realized by a web browser or any one of a variety of applications that receive and present content to the user.

Operation of the grace timer module 604, content request latency module 608, and modem state controller 610 may operate according to a user selection. For instance, where a user selects a power saving mode of the UE 600, all three of the grace timer module 604, content request latency module 608, and modem state controller 610 may operate. Where a user does not select, or deselects, a power saving mode of the UE 600, all three of the grace timer module 604, content request latency module 608, and modem state controller 610 may not operate. In alternative embodiments, a user selection or deselection of the power saving mode of the UE 600 may result in less than all three of the grace timer module 604, content request latency module 608, and modem state controller 610 operating. For instance, when a user selects the power saving mode, the grace timer module 604 and the modem state controller 610 may operate but not the content request latency module 608.

The grace timer module 604 can operate to determine whether one or more grace timers are to run and to select a length of one or more grace timers. A grace timer can be operated after a page load has completed and dynamic data transfer begins to download or UE 600 data upload occurs. A grace timer can also operate after the UE 600 modem has been idled and reactivation of the modem is required for the dynamic data transfer.

The grace timer module 604 can also determine whether a static or dynamic grace timer is to be operated. This decision, along with a selection of grace timer length, is carried out with the aid of the URL history sub-module 606, which looks at a history of similar modem usage to determine a length of the grace timer (static or dynamic) to use. For instance, URL history can be stored in the memory 614 of the UE 600 and analyzed by the URL history sub-module 606. Alternatively, the history can be stored on a remote server, and/or analysis can be performed remotely.

The grace timer module 604 can also use the content type sub-module 605 to determine whether a static or dynamic grace timer is to be used and to determine a length of the grace timer. The content type sub-module 605 looks at a type of content that is to be downloaded (e.g., HTML versus JAVA) and predicts a length of the grace timer that will allow the modem 616 to remain off while still in use, or predicts whether the grace timer should be dynamic or static, based on knowledge of the content to be downloaded. For instance, HTML may require more download time than JAVASCRIPT and thus a longer grace timer may be required.

The grace timer module 604 can also use the browser state sub-module 609 to determine whether a static or dynamic grace timer is to be used and to determine a length of the grace timer. The browser state sub-module 609 looks at the browser state (or current activity) and predicts a length of the grace timer that will allow the modem 616 to remain off while still in use, or predicts whether the grace timer should be dynamic or static, based on knowledge of the browser state. For instance, a browser that is evaluating JAVASCRIPT is in a different state than a browser that is parsing HTML, and different grace timers may be assigned based on which browser state the browser is in. It should be noted that the browser state sub-module may only be useful where content is being downloaded via a web browser.

The content request latency module 608 can operate to determine whether the modem 616 is put into the active or idle state between a user request for content and the start of download of that content. This can be done by determining a latency between the request and the start of the download. If the latency is larger than a threshold value, then the modem 616 can be idled until the content is ready to begin downloading. If the latency is too small, then the modem 616 is left in the active state. The content request latency module 608, like the grace timer module 604, can look to a history of communication activity, via the latency history sub-module 607, to determine whether there is sufficient latency to justify idling the modem.

The modem state controller 610 can control the modem 616 state, for instance by requesting that the network 620, by way of wireless connection controller 622, release the wireless connection 619. The modem state controller 610 can also instruct the modem 616 to enter the idle state. In particular, the modem state controller 610 instructs the modem 616 to enter an idle state in order to save power and instructs the modem 616 to return to the active state when there is a need for data transmission between the UE 600 and the network 620.

The modem 616 generally functions to provide wireless communications to the network 620. The modem 616 may be realized by several components including software-implemented logic and hardware and associated processing components that are well known to one of ordinary skill in the art, but are not depicted for clarity.

To get out of the idle state, the UE 600 may request an RRC connection to set up the modem 616 whenever data needs to be exchanged between the UE 600 and the network 620. This can be as a result of either an application on the UE 600 requiring a connection to send data, or as a result of the UE 600 monitoring a paging channel to indicate whether the UTRAN 108 or SGSN 118 has paged the UE 600 to receive data from an external data network such as a push server.

The network 620 (e.g., a wireless phone network alone or in combination with the Internet) includes a wireless connection controller 622 that controls the wireless connection 619 (e.g., based on DRX values). The network 620 or the UE 600 can instruct the wireless connection controller 622 to release the wireless connection 619 and thus enable the modem to enter the idle state. For instance, the modem state controller 610 can transmit a connection-release to the network 620, and the wireless connection controller 622, instructing or enabling the wireless connection controller 622 to release the wireless connection 619. Other similar frameworks can also be used to move into the idle state.

Figure 9:
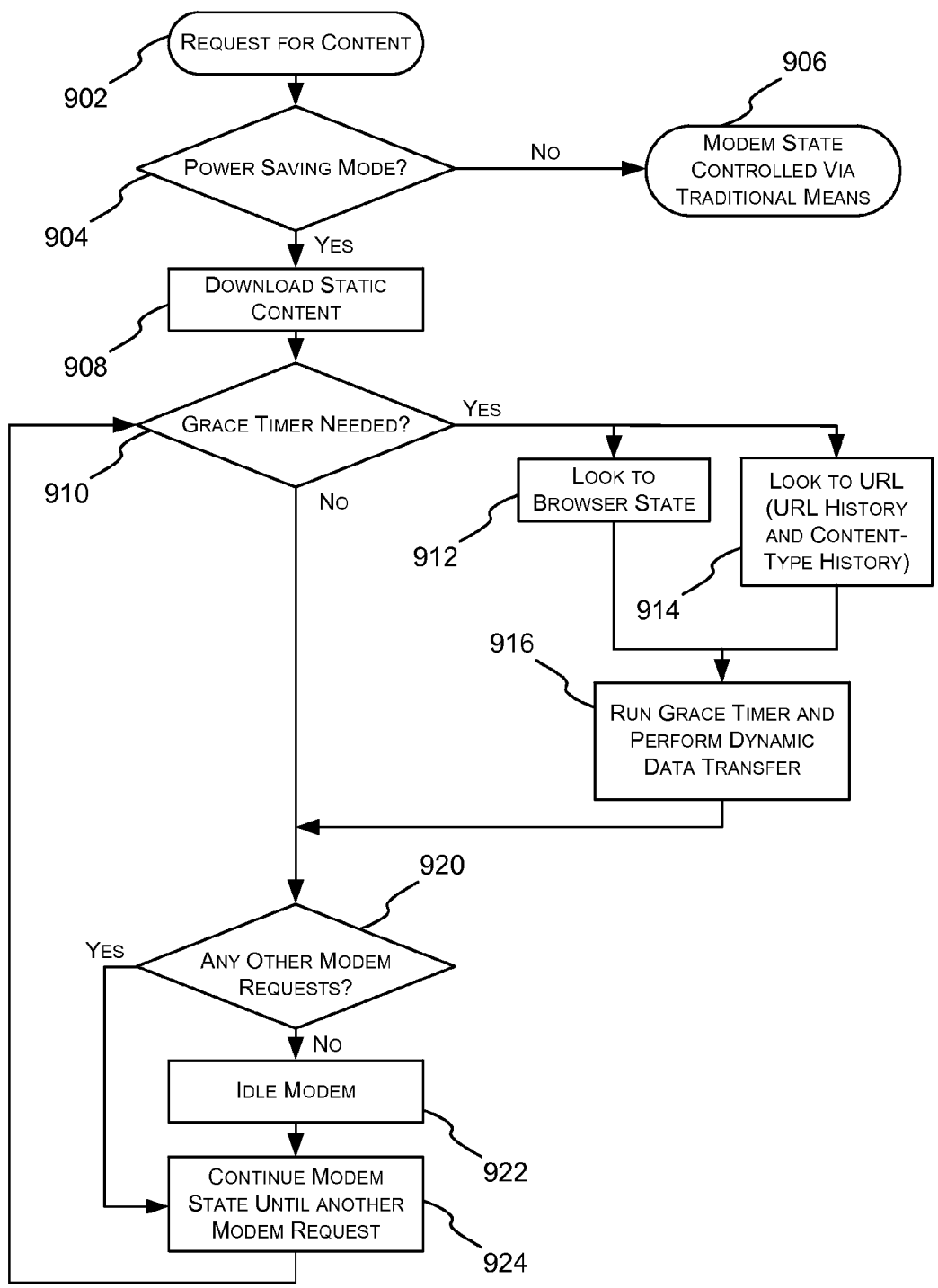
FIG. 9 illustrates yet another power saving method of operating a user equipment.

FIG. 9 illustrates yet another power saving method of operating a user equipment. A request for content 902 initiates the method. Decision 904 then determines whether the power saving method is to be run. If not, then the modem state can be controlled via traditional means 906. However, if the power saving method is to run, then static content can be downloaded 908 in response to the request 902. Once the static content has downloaded, a grace timer decision 910 decides whether there will be any dynamic data transfer, and thus whether a grace timer is to be activated. If not, then the method can move towards idling the modem state. Yet, if there will be dynamic data transfer, then the browser state is analyzed 912 and/or the URL is analyzed 914 to determine a length of the grace timer. The grace timer begins to run 916 as soon as the download of static content 908 is complete, and runs in parallel to the dynamic data transfer 916. The dynamic data transfer can include a download of dynamic content, UE data uploading, or further scripting to seek additional resources from the network. A duration of the grace timer is preferably equal to or greater than the duration of the dynamic data transfer and based on the analysis of the browser state 912 and/or the URL 914. The result of this analysis is a predicted dynamic data transfer duration, which is used to set the duration of the grace timer.

Once the grace timer finishes, or when no grace timer is needed, an any other modem requests decision 920 determines if any other modem requests have been made, are being made, or will be made in the near future. If no other applications or user requests for the modem exist, then the modem is put into an idle state 922. If the modem is needed, then the modem continues 924 in its current state (active) until another modem request for dynamic data transfer is made. If the modem is idled, then it continues 924 in its current state (idle) until another modem request for dynamic data transfer is made.

When another modem request for dynamic data transfer is made, the method loops back to grace timer decision 910 and a determining as to whether a grace timer is needed. If at any time during the method illustrated in FIG. 9, another request for content 902 occurs, then the method loops back to the request operation 902.

The decision 904 can be automated. For instance, when a UE battery charge falls below a threshold, the decision 904 can proceed with the power saving algorithm. If the battery charge is above the threshold, then power savings is not needed, and traditional methods for controlling the active and idle state of the modem can be carried out 906. In one instance, the power saving algorithm can be selected at the decision 904 when the UE is charging, or for devices that are often plugged in, the power saving method may be selected when the UE is unplugged from a power source. The decision 904 can also include user input. For instance, when the battery charge falls below a certain threshold, the user can be prompted to enter the power saving mode if desired. Other combinations of automated and user-controlled decisions can also be substituted for the power saving mode decision 904.

Whether a grace timer is needed (grace timer decision 910) depends on whether there is dynamic data transfer after the static content has completed downloading. If dynamic data transfer takes place, then the modem should remain on even after the static content is finished downloading, and thus a grace timer is needed.

Analyzing the browser state 912 (or the state of the browser stack) involves analysis as to what operations the browser is currently engaged in and predicting how long such actions will take. For instance, the analyzing the browser state 912 can include evaluating JAVASCRIPT or parsing HTML, to name two non-limiting examples. Different browser states can be associated with different grace timers or grace timer weighting factors, since the browser state may be analyzed in combination with the URL in order to determine a weighted grace timer. Analyzing the browser state 912 can thus determine a grace timer or weighting factor to be associated with the observed browser state.

Similarly, analyzing the URL 914 involves analysis of the history of the requested URL to determine a grace timer or weighting factor based on knowledge about the URL. For instance, historical data regarding durations of various dynamic data transfers may have been acquired for various URLs. Historical data regarding durations of dynamic data transfers may also have been acquired for different content types (e.g., JAVA versus HTML). The look to URL operation 914 can thus determine a grace timer or weighting factor for the URL being accessed.

The grace timer can be fixed or dynamic or both. In one embodiment, the grace timer can be compared to a threshold; if lower than the threshold, then a fixed grace timer (e.g., 1 or 2 seconds) is used, and if greater than the threshold, then a dynamic grace timer is used. The length of the grace timer can be determined based on the analysis of the browser state 912 and/or the analysis of the URL 914. In another embodiment, the grace timer always includes a fixed time plus a dynamic time, where the dynamic time can equal 0 or more seconds. For instance, the grace timer can equal the fixed time plus a variable value, where the variable value is equal to zero seconds if the predicted delay based on the analysis operation 912 and/or 914 is less than the fixed time.

Figure 7:
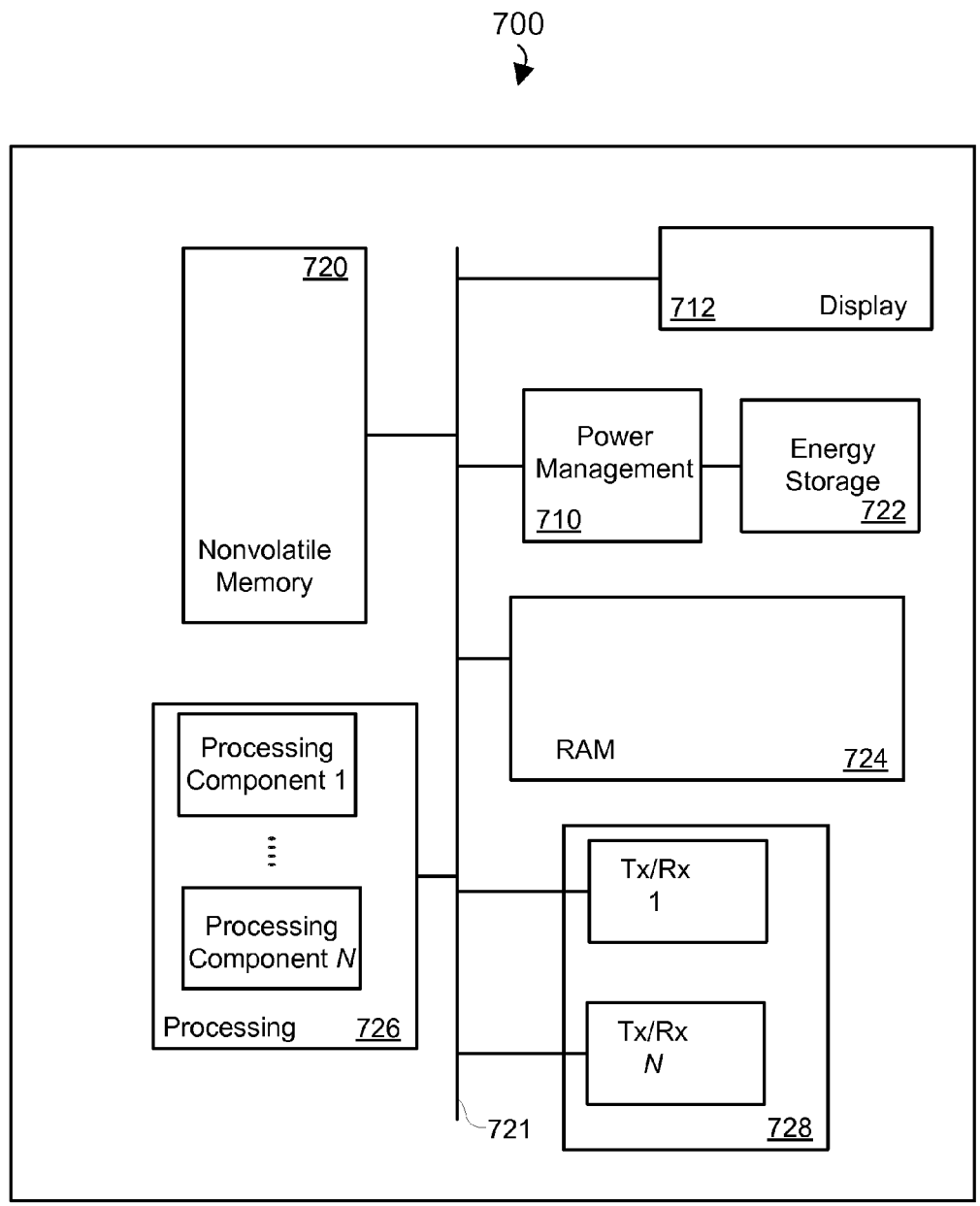
FIG. 7 is a block diagram depicting physical components of an exemplary embodiment of a mobile device.

Referring next to FIG. 7, shown is a block diagram depicting physical components of an exemplary embodiment of a mobile device 700. As shown, a power management component 710, display portion 712, and nonvolatile memory 720 are coupled to a bus 721 that is also coupled to random access memory ("RAM") 724, a processing portion (which includes N processing components) 726, and a transceiver component 728. Also shown is an energy storage portion 722 that is coupled to the power management component 710. Although the components depicted in FIG. 7 represent physical components of the mobile device 700 it is not intended to be a hardware diagram; thus many of the components depicted in FIG. 7 may be realized by common constructs or distributed among additional physical components. Moreover, it is certainly contemplated that other existing and yet-to-be developed physical components and architectures may be utilized to implement the functional components described with reference to FIG. 6.

In general, the nonvolatile memory 720 functions to store (e.g., persistently store) data and executable code including code that is associated with the functional components depicted in FIG. 6. In some embodiments for example, the nonvolatile memory 720 includes bootloader code, modem software, operating system code, file system code, and processor-executable code to facilitate the implementation of one or more portions of the grace timer module 604, content request latency module 608, and modem state controller 610.

In many implementations, the nonvolatile memory 720 is realized by flash memory (e.g., NAND or ONENAND memory), but it is certainly contemplated that other memory types may be utilized as well. Although it may be possible to execute the code from the nonvolatile memory 720, the executable code in the nonvolatile memory 720 is typically loaded into RAM 724 and executed by one or more of the N processing components in the processing portion 726.

The power management component 710 in the embodiment depicted in FIG. 7 generally operates to provide power capability information based upon a status of the energy storage portion 722. In addition, the power management component 710 may operate as a power source to regulate the application of power to hardware components of the mobile device 700 and regulate charging of the energy storage portion 722. In many implementations the energy storage portion 722 includes one or more rechargeable batteries (e.g., lithium-ion batteries), but it is certainly contemplated that the energy storage portion 722 may include other types of energy storage technologies (e.g., fuel cell or other technologies). The power capability information may include an indication of the amount of energy (e.g., in milliampere-hours (mAh)) that is available in the energy storage portion 722.

The N processing components 726 in connection with RAM 724 generally operate to execute the instructions stored in nonvolatile memory 720 to effectuate functional components depicted in FIG. 6. As one of ordinarily skill in the art will appreciate, the processing components 726 may include a video processor, modem processor, DSP, graphics processing unit (GPU), and other processing components.

The depicted transceiver component 728 includes N transceiver chains, which may be used in connection with the modem 616 and modem state controller 610 to communicate with a variety of types of networks. Each of the N transceiver chains represents a transceiver associated with a particular communication scheme. For example, one transceiver chain may operate according to wireline protocols, another transceiver may communicate according to Wi-Fi communication protocols (e.g., 802.11 protocols), another may communicate according to cellular protocols (e.g., CDMA or GSM protocols), and yet another may operate according to Bluetooth protocols. Although the N transceivers are depicted as a unitary transceiver component 728 for simplicity, it is certainly contemplated that the transceiver chains may be separately disposed about the mobile device 700.

The display 712 generally operates to provide visual images to a user that may include a user interface and content that is received in connection with many embodiments of the present invention. Although not depicted for clarity, one of ordinary skill in the art will appreciate that other components including a display driver and backlighting (depending upon the technology of the display) are also associated with the display 712.

Figure 8:
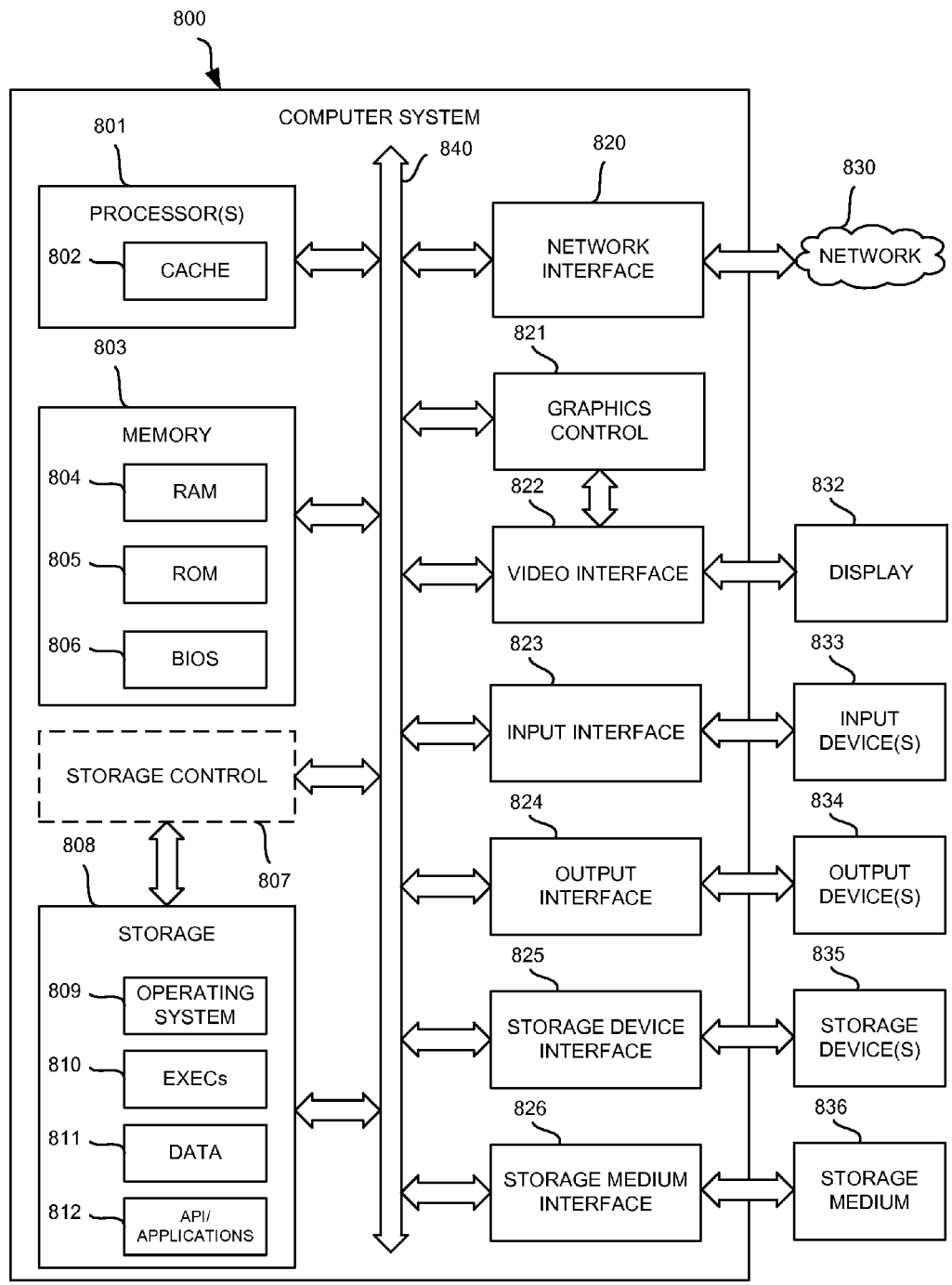
FIG. 8 shows a diagrammatic representation of one embodiment of a machine in the exemplary form of a computer system.

The systems and methods described herein can be implemented in a machine such as a computer system in addition to the specific physical devices described herein. FIG. 8 shows a diagrammatic representation of one embodiment of a machine in the exemplary form of a computer system 800 within which a set of instructions can execute for causing a device to perform or execute any one or more of the aspects and/or methodologies of the present disclosure. The components in FIG. 8 are examples only and do not limit the scope of use or functionality of any hardware, software, embedded logic component, or a combination of two or more such components implementing particular embodiments.

Computer system 800 may include a processor 801, a memory 803, and a storage 808 that communicate with each other, and with other components, via a bus 840. The bus 840 may also link a display 832, one or more input devices 833 (which may, for example, include a keypad, a keyboard, a mouse, a stylus, etc.), one or more output devices 834, one or more storage devices 835, and various tangible storage media 836. All of these elements may interface directly or via one or more interfaces or adaptors to the bus 840. For instance, the various tangible storage media 836 can interface with the bus 840 via storage medium interface 826. Computer system 800 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 801 (or central processing unit(s) (CPU(s))) optionally contains a cache memory unit 802 for temporary local storage of instructions, data, or computer addresses. Processor(s) 801 are configured to assist in execution of computer readable instructions. Computer system 800 may provide functionality as a result of the processor(s) 801 executing software embodied in one or more tangible computer-readable storage media, such as memory 803, storage 808, storage devices 835, and/or storage medium 836. The computer-readable media may store software that implements particular embodiments, and processor(s) 801 may execute the software. Memory 803 may read the software from one or more other computer-readable media (such as mass storage device(s) 835, 836) or from one or more other sources through a suitable interface, such as network interface 820. The software may cause processor(s) 801 to carry out one or more processes or one or more steps of one or more processes described or illustrated herein. Carrying out such processes or steps may include defining data structures stored in memory 803 and modifying the data structures as directed by the software.

The memory 803 may include various components (e.g., machine readable media) including, but not limited to, a random access memory component (e.g., RAM 804) (e.g., a static RAM "SRAM", a dynamic RAM "DRAM, etc.), a read-only component (e.g., ROM 805), and any combinations thereof. ROM 805 may act to communicate data and instructions unidirectionally to processor(s) 801, and RAM 804 may act to communicate data and instructions bidirectionally with processor(s) 801. ROM 805 and RAM 804 may include any suitable tangible computer-readable media described below. In one example, a basic input/output system 806 (BIOS), including basic routines that help to transfer information between elements within computer system 800, such as during start-up, may be stored in the memory 803.

Fixed storage 808 is connected bidirectionally to processor(s) 801, optionally through storage control unit 807. Fixed storage 808 provides additional data storage capacity and may also include any suitable tangible computer-readable media described herein. Storage 808 may be used to store operating system 809, EXECs 810 (executables), data 811, APV applications 812 (application programs), and the like. Often, although not always, storage 808 is a secondary storage medium (such as a hard disk) that is slower than primary storage (e.g., memory 803). Storage 808 can also include an optical disk drive, a solid-state memory device (e.g., flash-based systems), or a combination of any of the above. Information in storage 808 may, in appropriate cases, be incorporated as virtual memory in memory 803.

In one example, storage device(s) 835 may be removably interfaced with computer system 800 (e.g., via an external port connector (not shown)) via a storage device interface 825. Particularly, storage device(s) 835 and an associated machine-readable medium may provide nonvolatile and/or volatile storage of machine-readable instructions, data structures, program modules, and/or other data for the computer system 800. In one example, software may reside, completely or partially, within a machine-readable medium on storage device(s) 835. In another example, software may reside, completely or partially, within processor(s) 801.

Bus 840 connects a wide variety of subsystems. Herein, reference to a bus may encompass one or more digital signal lines serving a common function, where appropriate. Bus 840 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 800 may also include an input device 833. In one example, a user of computer system 800 may enter commands and/or other information into computer system 800 via input device(s) 833. Examples of an input device(s) 833 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 833 may be interfaced to bus 840 via any of a variety of input interfaces 823 (e.g., input interface 823) including, but not limited to, serial, parallel, game port, USB, FIREWIRE, THUNDERBOLT, or any combination of the above.

In particular embodiments, when computer system 800 is connected to network 830, computer system 800 may communicate with other devices, specifically mobile devices and enterprise systems, connected to network 830. Communications to and from computer system 800 may be sent through network interface 820. For example, network interface 820 may receive incoming communications (such as requests or responses from other devices) in the form of one or more packets (such as Internet Protocol (IP) packets) from network 830, and computer system 800 may store the incoming communications in memory 803 for processing. Computer system 800 may similarly store outgoing communications (such as requests or responses to other devices) in the form of one or more packets in memory 803 and communicated to network 830 from network interface 820. Processor(s) 801 may access these communication packets stored in memory 803 for processing.

Examples of the network interface 820 include, but are not limited to, a network interface card, a modem, and any combination thereof. Examples of a network 830 or network segment 830 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 830, may employ a wired and/or a wireless mode of communication. In general, any network topology may be used.

Information and data can be displayed through a display 832. Examples of a display 832 include, but are not limited to, a liquid crystal display (LCD), an organic liquid crystal display (OLED), a cathode ray tube (CRT), a plasma display, and any combinations thereof. The display 832 can interface to the processor(s) 801, memory 803, and fixed storage 808, as well as other devices, such as input device(s) 833, via the bus 840. The display 832 is linked to the bus 840 via a video interface 822, and transport of data between the display 832 and the bus 840 can be controlled via the graphics control 821.

In addition to a display 832, computer system 800 may include one or more other peripheral output devices 834 including, but not limited to, an audio speaker, a printer, and any combinations thereof. Such peripheral output devices may be connected to the bus 840 via an output interface 824. Examples of an output interface 824 include, but are not limited to, a serial port, a parallel connection, a USB port, a FIREWIRE port, a THUNDERBOLT port, and any combinations thereof.

In addition or as an alternative, computer system 800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
   operating a modem of a user equipment in an active state when download of content is requested;
   downloading static content to a memory of the user equipment;
   determining if dynamic data transfer is to follow the downloading of the static content;
   if there is to be dynamic data transfer, then:
      starting a grace timer upon completion of the downloading of the static content;
      performing the dynamic data transfer; and
      ending the grace timer after a time predicted to coincide with completion of the performing dynamic data transfer; and
   operating the modem of the user equipment in a first idle state when the grace timer has ended.

2. The method of claim 1, wherein the time after which the grace timer ends is:
   fixed if a time predicted to coincide with completion of the performing dynamic modem usage is less than a first fixed grace timer threshold, and
   dynamic if the time predicted to coincide with completion of the performing dynamic modem usage is greater than or equal to the first fixed grace timer threshold.

3. The method of claim 2, wherein a length of the grace timer if fixed is substantially equal to the first fixed grace timer threshold.

4. The method of claim 1, wherein the time predicted to coincide with completion of the performing dynamic data transfer is predicted using historical trends for dynamic data transfer associated with the content.

5. The method of claim 1, wherein the time predicted to coincide with completion of the performing dynamic data transfer is predicted using a known time of dynamic data transfer corresponding to a type of the content.

6. The method of claim 1, wherein the time predicted to coincide with completion of the performing dynamic data transfer is predicted by calculating a reference time based on at least one prior test of the dynamic data transfer.

7. The method of claim 1, further comprising the modem of the user equipment in a second idle state if a predicted length of time between the request for download of the content and a predicted start of the dynamic data transfer is greater than a second fixed grace timer threshold.

8. The method of claim 7, wherein the predicted length of time is calculated based on historical latency trends for similar requests for download of the content.

9. The method of claim 1, further comprising starting the grace timer a second time at the start of a second performing dynamic data transfer following the performing dynamic data transfer.

10. The method of claim 9, operating the modem of the user equipment in a third idle state after the grace timer ends a second time.

11. The method of claim 1, further comprising operating the modem of the user equipment in the first idle state as long as there are no other concurrent or pending requests for the modem of the user equipment.

12. The method of claim 1, wherein the performing dynamic data transfer is a download of a dynamic content, associated with the static content, to the memory of the user equipment.

13. The method of claim 1, wherein the performing dynamic data transfer is an upload to a network from the memory of the user equipment.

14. The method of claim 1, wherein the performing dynamic data transfer is scripting to retrieve further content from a network.

15. The method of claim 1, further comprising starting the grace timer upon a start of the performing of dynamic data transfer.

16. A user equipment comprising:
   a modem configured to have a connection to a network and to perform static and dynamic data transfer to and from the network via the connection when in an active state, the modem downloading static content in response to a request for at least the static content;
   a modem state controller configured to, after a grace timer has run, cause release of the connection to the modem thus allowing the modem to enter an idle state; and
   a grace timer module configured to:
      determine if the modem is to perform dynamic data transfer following the downloading of the static content, and if so, to:
         estimate a predicted length of time for the dynamic data transfer;
         determine if the predicted length of time for the dynamic data transfer is longer than a fixed time delay;
         instruct the modem state controller to cause release of the connection to the modem after:
            the fixed time delay if the predicted length of time for the dynamic data transfer is less than or equal to the fixed time delay; and
            a dynamic time delay if the predicted length for the dynamic data transfer is greater than the fixed time delay, wherein the dynamic time delay is substantially equal to the predicted length of time for the dynamic data transfer;
      and if not, then instruct the modem state controller to cause release of the connection to the modem after the downloading of the static content.

17. The user equipment of claim 16, wherein the grace timer module is further configured to instruct the modem state controller to cause release of the connection to the modem after:
   the fixed time delay if the predicted length of time for the dynamic data transfer is less than or equal to the fixed time delay; and
   a dynamic time delay that is longer than the fixed time delay if the predicted length for the dynamic data transfer is greater than the fixed time delay.

18. The user equipment of claim 16, wherein the predicted length of time is estimated based on at least historical trends for dynamic data transfer associated with the content.

19. The user equipment of claim 16, wherein the predicted length of time is estimated using a known time of dynamic data transfer for a type of the content.

20. The user equipment of claim 16, wherein the predicted length of time is estimated by calculating a reference length of time based on at least one prior test of the dynamic data transfer.

21. The user equipment of claim 16, wherein the grace timer module is further configured to instruct the modem state controller to cause release of the connection to the modem after the request for the content is made.

22. The user equipment of claim 21, further comprising a latency module of the user equipment configured to instruct the modem state controller to cause release of the connection to the modem if a predicted length of time between when the request for the content is made and a beginning of the downloading the static content is greater than a threshold value.

23. The user equipment of claim 22, wherein the threshold value is calculated based on historical latency trends for similar requests for the content.

24. The user equipment of claim 16, wherein the grace timer module is further configured to only instruct the modem state controller to cause release of the connection to the modem if there are no other requests for the active state of the modem.

25. An apparatus comprising:
a means for operating a user equipment modem in an active state;
a means for downloading content to the user equipment;
a means for running a grace timer configured to run from the end of the downloading the content until an end of any dynamic data transfer following the downloading of the content, where the grace timer is fixed if a predicted grace requirement is less than a threshold time, and where the grace timer is dynamic if the predicted grace requirement is greater than or equal to the threshold time;
a means for operating the user equipment modem in an idle state after running the grace timer; and
a means for returning the user equipment modem to the active state when a request for the active state of the modem arises.

26. The apparatus of claim 25, wherein the grace timer, if dynamic, has a duration equal to the predicted grace requirement.

27. The apparatus of claim 25, wherein the predicted grace requirement is based on a known duration of dynamic data transfer associated with a type of the content.

28. The apparatus of claim 25, wherein the predicted grace requirement is based on historical trends for dynamic data transfer associated with the content.

29. The apparatus of claim 25, wherein the threshold time corresponds to a time predicted to be sufficient for a static portion of the content to download to the user equipment.

30. A non-transitory, tangible computer readable storage medium, encoded with processor readable instructions for user equipment power savings via a method of controlling an active and an idle state of a modem of a user equipment, the method comprising:
operating a user equipment modem in an active state;
downloading content to the user equipment;
running a grace timer configured to run from the end of the downloading the content until an end of any dynamic data transfer following the downloading of the content, where the grace timer is fixed if a predicted grace requirement is less than a threshold time, and where the grace timer is dynamic if the predicted grace requirement is greater than or equal to the threshold time;
operating the user equipment modem in an idle state after running the grace timer; and
returning the user equipment modem to the active state when a request for the active state of the modem arises.

* * * * *